United States Patent Office 2,910,477
Patented Oct. 27, 1959

2,910,477

PREPARATION OF PIPERAZINE

Merton Wayne Long, Jr., Midland, Mich., assignor to The Dow Chemical Company, Midland, Mich., a corporation of Delaware No Drawing. Application October 18, 1956
Serial No. 616,656

4 Claims. (Cl. 260—268)

The aim and concern of the instant invention is to provide another manufacturing process for piperazine.

Such contribution to the art is propitiously possibilitated by ammonating diethanolamine in the presence of a Raney nickel catalyst mass in the thermal range from about 125 to 300° C. and under 500 to 2,500 pounds per square inch of pressure. Superior results may frequently be obtained when the ammonation is conducted at a temperature between about 175 and 225° C. and under a pressure between about 750 and 2,000 pounds per square inch.

Despite theoretics, it is advantageous to employ between about three and fifteen moles of ammonia per mole of diethanolamine being ammonated to obtain substantial conversions of the diethanolamine and relatively high consequent yields of piperazine. A very favorable ratio of ammonia to diethanolamine is about ten to one, respectively, on a molar basis. An amount of the catalyst mass between about one and twenty percent by weight, based on the weight of the diethanolamine, consistently provides highly satisfactory results.

Practice of the invention may be conveniently effected by ammonating liquid phase diethanolamine according to batchwise techniques using pressure bombs or equivalent devices for the reaction. Efficient agitation of the reactants, as may be accomplished in revolving or rocking type apparatus, augments the ammonation and facilitates achievement of a felicific end within reaction times of twelve and frequently eight or less hours. Operation on a continuous basis, optionally possible, generally requires transmittal of the reactants and the associated catalyst mass through suitable reaction chambers. The manufactured piperazine may be recovered facilely by solvent extraction, filtration, distillation, crystallization or other apparent procedures adeptly conducted to meet any involved criteria for product purities.

To afford further illustration, a one and one-half liter, gas-fired, revolving bomb was pre-chilled and charged with 200 grams (1.9 moles) of diethanolamine, 168 grams (9.88 moles) of anhydrous, liquid ammonia and 7 grams of Raney nickel. The bomb was closed and synthermally maintained at about 200° C. for eight hours. A developed pressure between about 1,700 and 1,850 pounds per square inch was observed in the bomb during the ammonation. At the end of the reaction period, the bomb was cooled and vented through a Dry Ice trap to remove unreacted ammonia. About 200 grams of the reaction mass, in which about 41.1 percent of the diethanolamine had been converted, was recovered. An 86 percent yield of pure piperazine, in the amount of about 58.6 grams, was finally obtained by fractional distillation of the reaction mass.

What is claimed is:

1. Piperazine manufacturing process consisting essentially of ammonating each mole of diethanolamine with about 3 to 15 moles of ammonia in the presence of a Raney nickel catalyst mass in the thermal range from about 125 to 300° C. and under 500 to 2,500 pounds per square inch of pressure.

2. In the process of claim 1, ammonating in the thermal range from about 175 to 225° C. and under 750 to 2000 pounds per square inch of pressure.

3. In the process of claim 1, ammonating each mole of diethanolamine with about ten moles of ammonia.

4. In the process of claim 1, ammonating in the presence of from one to twenty percent by weight (of the diethanolamine) of the Raney nickel catalyst mass.

References Cited in the file of this patent

UNITED STATES PATENTS 2,525,223     Howard _____ Oct. 10, 1950